United States Patent [19]

Schutz

[11] Patent Number: 5,665,189
[45] Date of Patent: Sep. 9, 1997

[54] PROCESS FOR RECONDITIONING OF STANDARDIZED PLASTIC TIGHT HEAD DRUMS

[75] Inventor: Udo Schutz, Selters, Germany

[73] Assignee: Schutz-Werke GmbH & Co. KG, Selters, Germany

[21] Appl. No.: 531,066

[22] Filed: Sep. 20, 1995

[30] Foreign Application Priority Data

Sep. 20, 1994 [DE] Germany ............ 44 33 418.4

[51] Int. Cl.⁶ .................................. B32B 35/00
[52] U.S. Cl. ..................... 156/98; 156/69; 156/94
[58] Field of Search .................. 156/69, 94, 98, 156/308.4, 309.6; 220/254; 29/402.01, 402.09, 402.11

[56] References Cited

U.S. PATENT DOCUMENTS

| 5,556,494 | 9/1996 | Schutz | 156/69 |
| 5,568,876 | 10/1996 | Schutz | 220/254 |

FOREIGN PATENT DOCUMENTS

| 2111558 | 6/1994 | Canada . | |
| 37 37 884 | 8/1989 | Germany . | |
| 37 37 977 | 12/1991 | Germany . | |
| 92 18 003.5 | 6/1993 | Germany . | |
| 42 20 339 | 1/1994 | Germany . | |
| 42 42 370 | 5/1994 | Germany . | |

Primary Examiner—Daniel Stemmer
Attorney, Agent, or Firm—Young & Thompson

[57] ABSTRACT

A process for reconditioning a standardized tight head drum for re-use as either a tight-head drum or a wide-neck drum. The standardized tight head drum has an upper head drum welded to the drum body at a seam. This drum is reconditioned by separating the upper drum head from the drum along a cut line at a location below the seam. The cut edge is smoothed and sized and the interior of the drum is cleaned. For re-use as a tight head drum, an upper head having a fill plug and a vent plug is welded onto the cut edge of the drum. For re-use as a wide-neck drum, a neck ring is welded onto the cut edge and a wide-neck drum cover is placed on the neck ring. The reconditioned tight head and wide-neck drums have the same nominal volume and the same height and diameter dimensions as the tight head drum prior to reconditioning.

9 Claims, 6 Drawing Sheets

PROCESS FOR RECONDITIONING OF STANDARDIZED PLASTIC TIGHT HEAD DRUMS

BACKGROUND OF THE INVENTION

1. Field of the Invention

The invention relates to a process for reconditioning of standardized tight head drums of plastic which are made in one piece by blow molding or which consist of a blow-molded drum body with welded, injection-molded upper drum head, for re-use as tight head drums or for use as wide-neck drums, the reconditioned tight head and wide-neck drums having the same nominal volume and the same height and diameter dimensions according to DIN standard.

Strict legal environmental protection regulations require the transition from disposable to re-usable packing drums such as plastic or steel drums and conversion to packing drums with larger volume with the objective of reducing residual amounts and developing new re-usable packing drums which can be reconditioned with respect to relieving the environment of harmful materials and which can be easily cleaned and from which all residues can be optimally removed for reconditioning and for proper disposal by destruction without pollutants, for example, by burning or for reprocessing of the production material.

2. Description of Related Art

The development of reconditionable hard packing drums which are easy to dispose of and which are protected against contamination by pollutants, essentially steel and plastic drums, led to generic tight head drums and for example tight head drums with removable cover known from DE 35 39 656 A1 which in part replace the closed tight head drums used to date. These drums are provided as required with a flexible inside covering called the inliner or a bag of plastic film, for example, polyethylene film, or of a diffusion-proof coextruded metal-plastic composite foil, for example an aluminum foil covered on both sides with polyethylene. Drums with an inliner are known for example from DE 88 10 760 U1. Inliners are used in plastic and steel drums when they are filled with products which are difficult to dispose of, such as dispersions, for example, dyes, which can hardly be removed from the drum wall after drying. Inliners of a diffusion-proof composite foil in plastic drums suppress diffusion of solvent-containing contents into the drum wall and possible rediffusion of solvents from the drum wall. In steel drums the inliner saves the inside coating previously necessary to protect the steel sheet against corrosive media and corrosion.

From DE 42 42 370 C1 a process is known for reconditioning of tight head drums with a blow-molded wide-neck drum body with a drum border and injection-molded tight head cover welded onto the drum border with a flange for re-use as a closed tight-head drum or for re-use as a wide-neck drum with removable cover.

The necking-in of the wide-neck drum body used for a tight head drum with a nominal volume of for example 220 liters in the neck area which is necessary for an arrangement of the drum border within the outline of the drum body compared to a tight head drum with the same nominal volume according to DIN 6131 with a drum body which is roughly continuously cylindrical and which has the same diameter as the wide-neck drum body results in a larger drum height compared to the standardized tight-head drum to obtain a nominal volume of 220 liters.

These different drum heights result in the disadvantage that mixed stacking of tight head drums with a wide-neck drum body and a welded-on tight head cover as well as of wide neck drums with a removable cover according to DE 42 42 370 C1 and of tight head drums blown in one piece according to DIN 6131 for transport by means of standardized containers and for storage purposes is impossible.

SUMMARY OF THE INVENTION

The object of the invention is to develop a process for reconditioning of used tight head drums of plastic according to DIN standard which are produced by blow molding in one piece or which consist of a blow molded drum body with a welded-on injection molded upper head, for re-use as a tight head drum or for re-use as a wide-neck drum, in which the reconditioned tight head and wide-neck drums should have the same nominal volume and the same height and diameter dimensions according to the DIN standard with respect to mixed stackability for transport and storage purposes.

The process according to the invention enables cost-favorable reconditioning of used tight head drums which satisfy the highest safety requirements for liquid hazardous materials according to DIN standards and price-favorable retrofitting of standardized tight head drums into wide-neck drums with simple removable cover or tight head cover with a clamping ring for transport and storage of liquid, granulate and powder materials which are classified in the lower hazard classes. Based on the same height and diameter dimensions the reconditioned tight head and wide-neck drums for transport and storage purposes are stacked mixed.

BRIEF DESCRIPTION OF THE DRAWINGS

Other features and advantages of the present invention will become apparent from a consideration of the following description, taken in connection with the accompanying drawings, in which.

DESCRIPTION OF THE PREFERRED EMBODIMENTS

Figure 1:
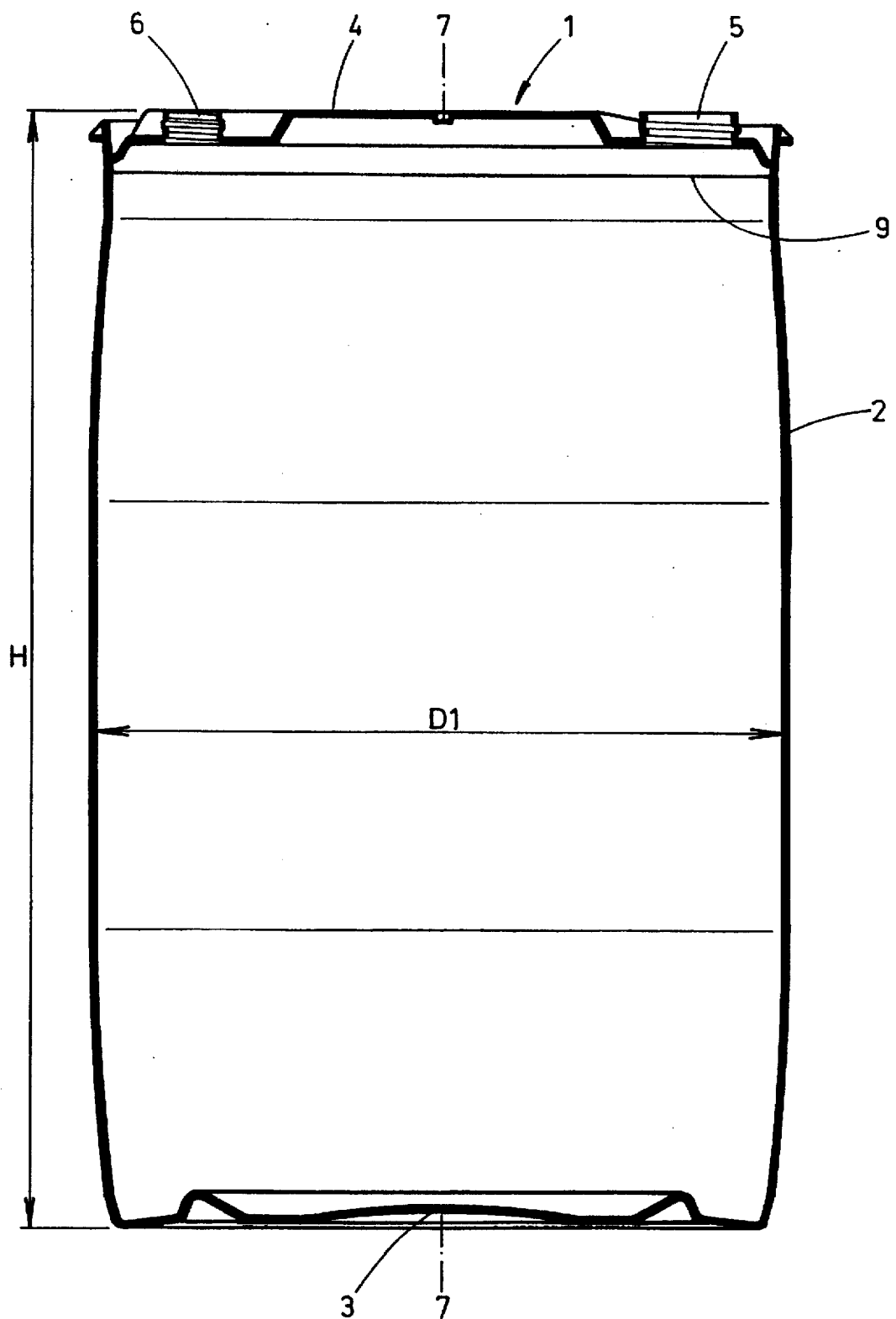
FIG. 1 is a cross-sectional view of a drum adapted to be reconditioned according to the process of the present invention.

Used tight head drum 1 according to DIN 6131 of thermoplastic, for example, polyethylene, according to FIG. 1, which is reconditioned according to the process described below for re-use as a wide-neck drum has drum body 2 and lower head 3 which are blow molded in one part, as well as upper head 4 welded onto drum body 2 with fill and tapping plug 5 and vent plug 6.

Standardized tight-head drum 1 with a nominal volume of for example 220 liters has drum body diameter D1 of 581 millimeters with a tolerance of ±3 millimeters and a height H of 935 millimeters with a tolerance of ±5 millimeters.

Figure 2:
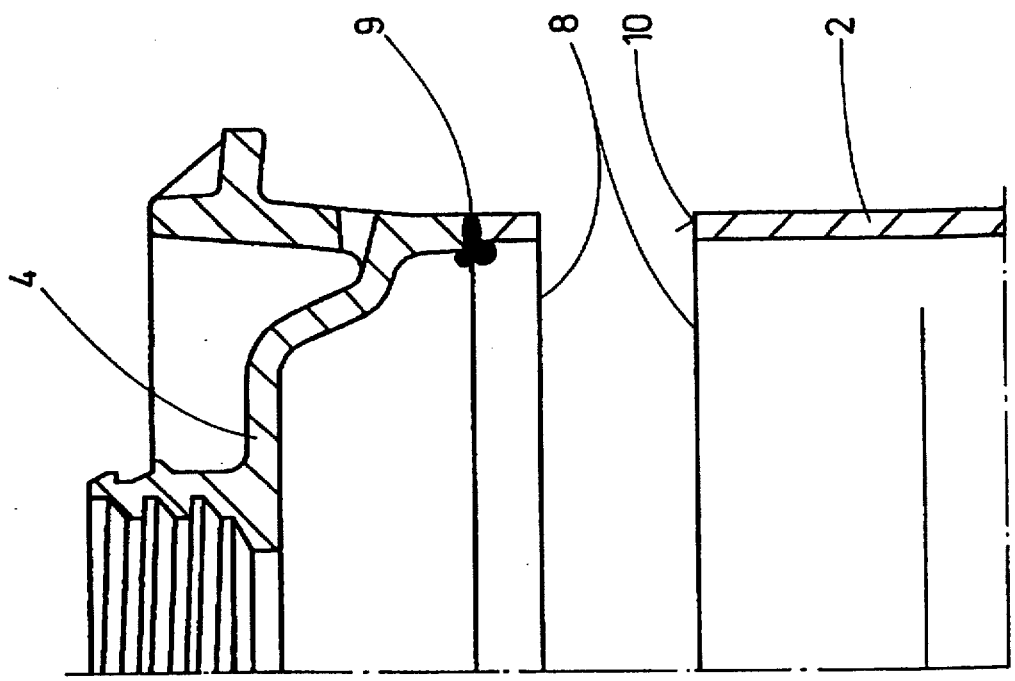
FIG. 2 is an enlarged fragmentary cross-sectional view showing a step at the beginning of reconditioning.

At the start of the reconditioning process upper drum head 4 is mechanically separated from drum body 2 of tight head drum 1 transversely to longitudinal axis 7—7 of the drum, parting cut 8 being placed below seam 9 between drum body 2 and upper drum head 4 (FIG. 2).

Figure 3:
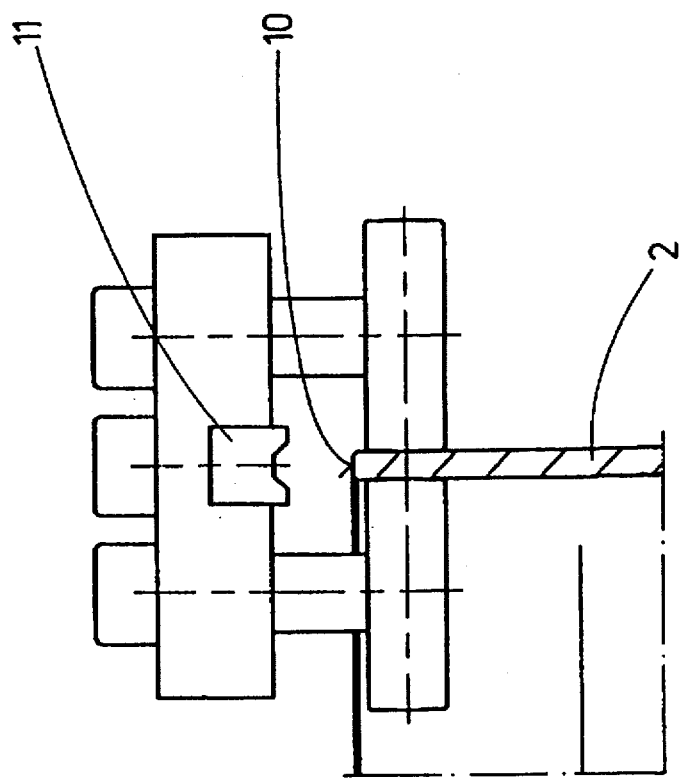
FIG. 3 is an enlarged fragmentary cross-sectional view showing smoothing of the annular cut edge of the drum body.

At this point annular cut edge 10 of drum body 2, the edge formed by separating upper head 4, is pared or shaped smooth with blade 11 or a shaping tool which is not shown, either the tool running round the cut edge or the drum body rotating with the cut edge under the tool (FIG. 3).

Figure 4:
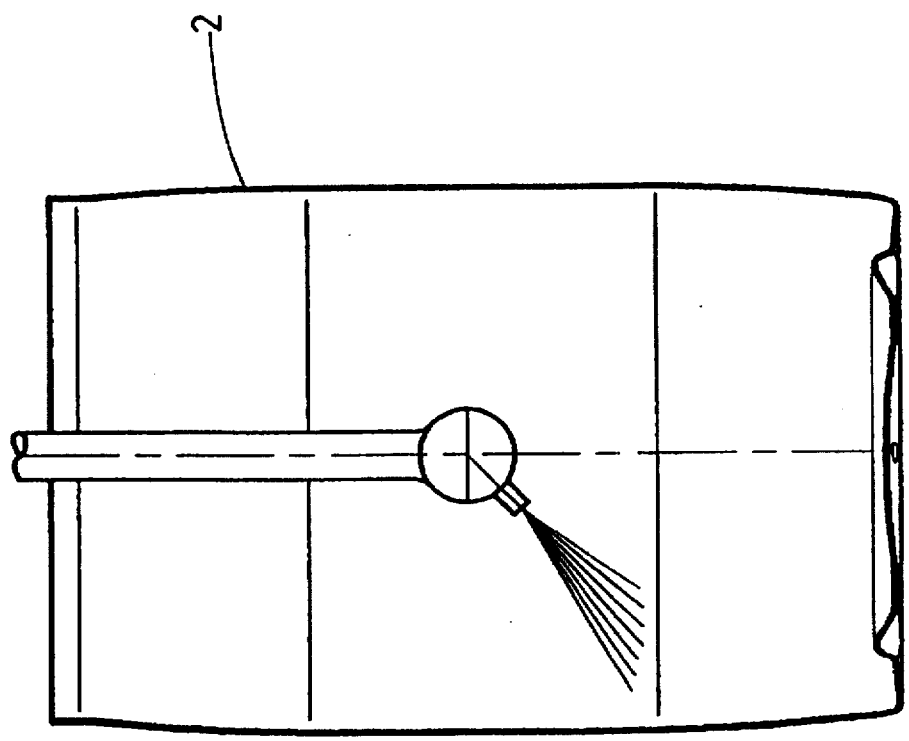
FIG. 4 is a schematic cross-sectional view of a further step comprising cleaning.

Afterwards drum body 2 is cleaned (FIG. 4).

Figure 5:
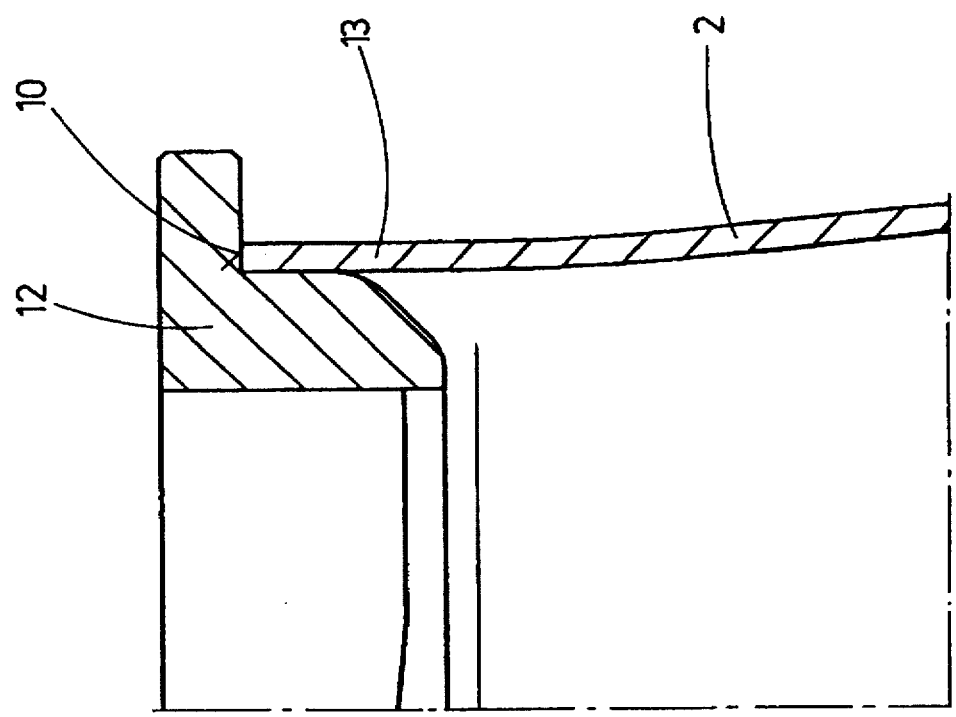
FIG. 5 is an enlarged fragmentary cross-sectional view showing the subsequent step of sizing the cut edge of the cleaned drum body.

Then cut edge 10 of cleaned drum body 2 is sized. To do this drum body 2 with cut edge 10 treated for welding is pushed onto sizing arbor 12 and heated in the area of cut edge 10 such that drum body 2 upon subsequent cooling is shrink fitted with cut edge section 13 onto sizing arbor 12 (FIG. 5).

Figure 6:
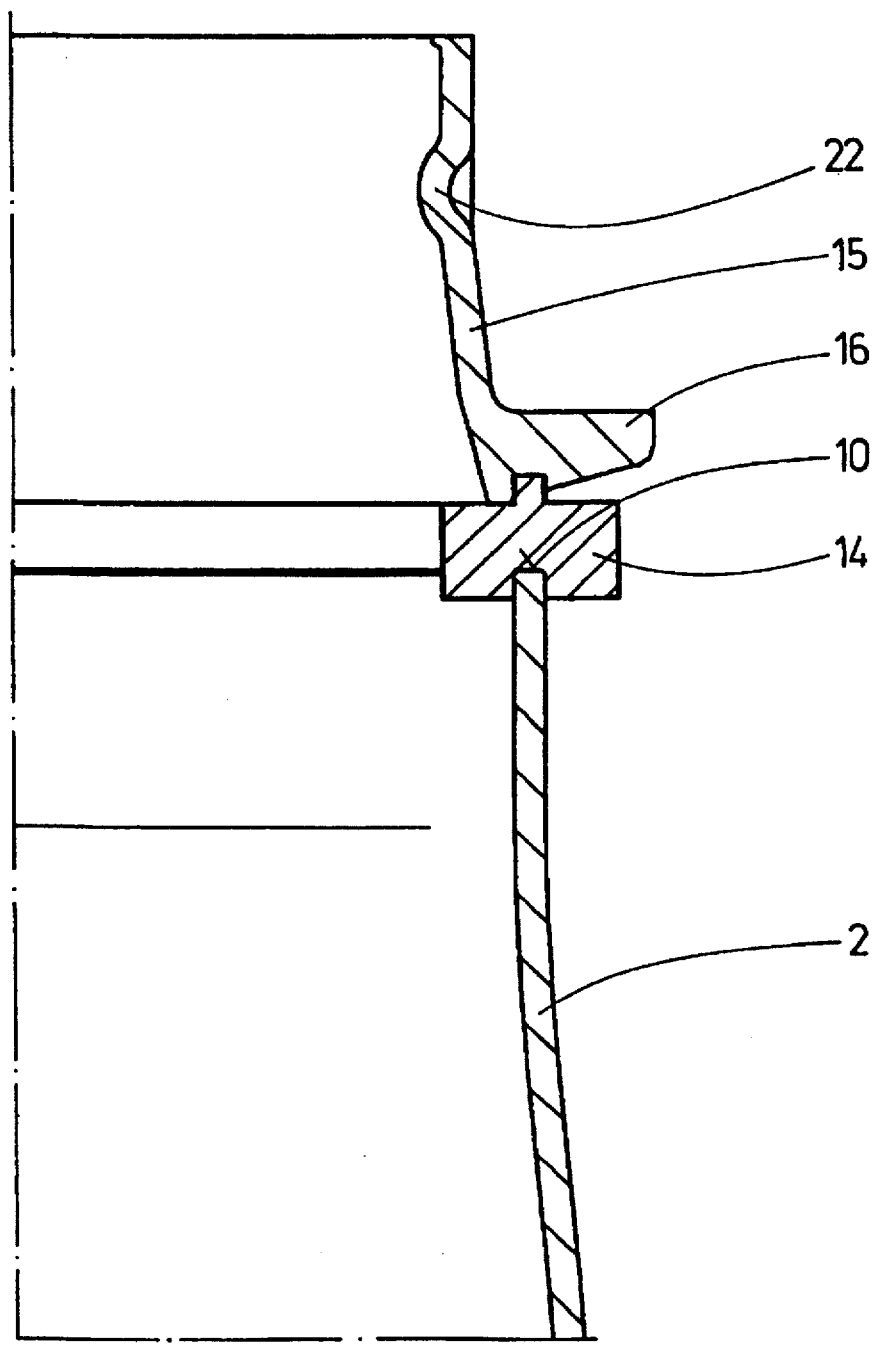
FIG. 6 is an enlarged fragmentary cross-sectional view of the next step comprising the addition of an injection molded neck ring.

Subsequently drum body 2 is removed from sizing arbor 12 and injection molded neck ring 15 of plastic with peripheral border 16 which projects radially to the outside on the lower edge is welded on sized cut edge 10 of drum body 2 by means of heating plate 14 to form wide-neck drum 17 with diameter D2 which is less than diameter D1 of drum body 2 (FIG. 6).

Figure 7:
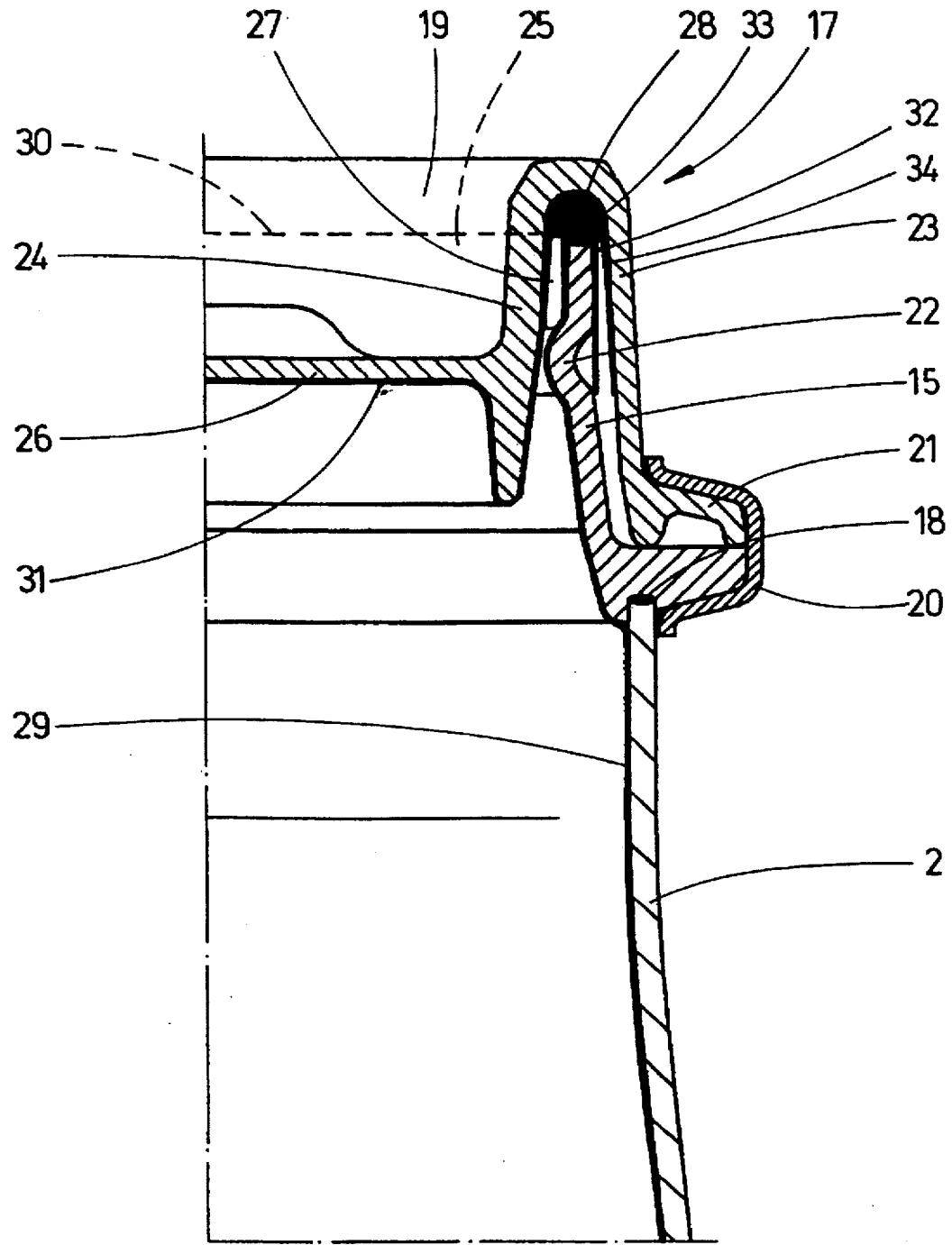
FIG. 7 is an enlarged fragmentary cross-sectional view showing attachment of a cover.
Figure 8:
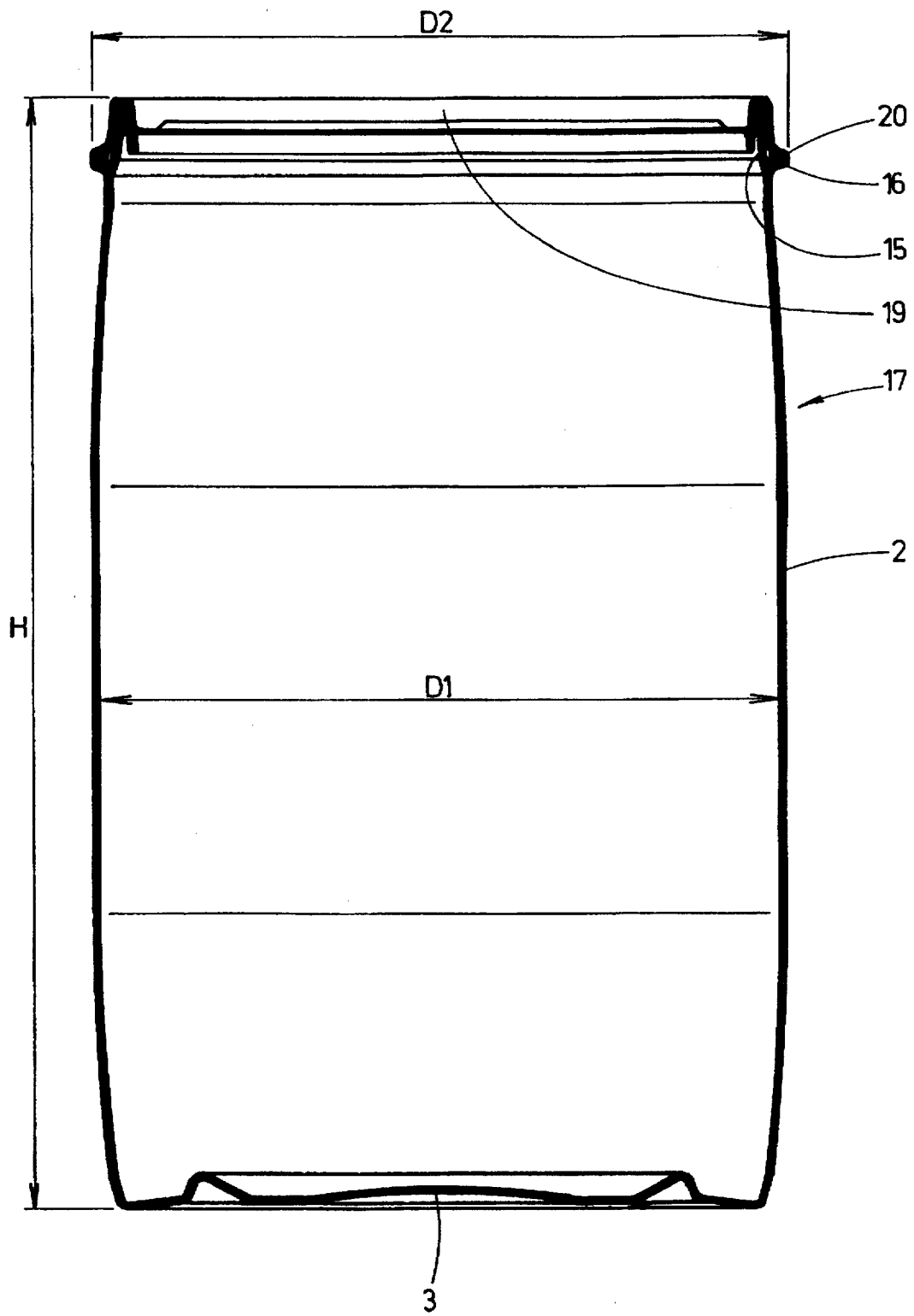
FIG. 8 is a cross-sectional view of the reconditioned drum produced by the step of FIG. 7.

After smoothing seam 18 between drum body 2 and neck ring 15 with a shaping or paring tool and leak testing of drum body 2, on neck ring 15 injection molded wide-neck drum cover 19 is attached with clamp ring 20 which laps over cover flange 21 molded on the lower edge of drum cover 19 and which fits under border 16 of neck ring 15 (FIGS. 7 and 8).

Instead of sealing with simple wide-neck drum cover 19, wide-neck drum 17 can also be sealed with a removable tight-head cover.

Neck ring 15 welded onto drum body 2 has beads 22 distributed over the circumference to stiffen and support wide-neck drum cover 19 which has outside edge 23 which surrounds neck ring 15 and inside edge 24 which dips into neck ring 15 and which projects above cover head 26 which is located beneath drum opening 25. Outside edge 23 and inside edge 24 of wide-neck drum cover 19 form annulus 27; into its base a binary sealing mass, for example, polyurethane with hardener, is injected which forms sealing ring 28.

Before seating wide-neck drum cover 19 on neck ring 15 which is welded onto drum body 2 a film bag or inliner 29 of plastic film, for example, polyethylene film, is inserted into drum body 2 and drum over opening edge 30 of wide-neck drum 17 so that inliner 29 is clamped between opening edge 30 and sealing ring 28.

For protection against a liquid inside inliner 29 cover 19 can be provided with inside lining 31 of a metal-plastic composite foil. Inside lining 31 is prefabricated as a disk, for example, from aluminum foil covered on one side with polyethylene, and the disk is inserted fitted to the outline of the cover into wide-neck drum cover 19 such that the aluminum foil lies against the inside of the cover. To support the adhesive action which occurs by molding the disk of a metal-plastic composite foil into cover 19 between it and formed inside lining 31 the inside lining can be welded or cemented in places to the inside of the cover.

After filling drum 17 with a liquid and closing drum cover 19 by means of clamp ring 20 upper edge 32 of inliner 29, the edge turned down to the outside over opening edge 30 of drum 17, and inside lining 31 of cover 19 in the area of opening edge 30 are welded peripherally to one another by induction welding, for example, with an electrical high frequency coil. By welding, inliner 29 and inside lining 31 form a liquid-tight inside covering which ensures that no liquid spills if clamp ring 20 becomes loose, detaches or pops off and in case of loosening of cover 19 caused thereby due to the action of external forces if the drum falls or turns over.

To empty drum 17, first of all cover 19 is removed, inside lining 31 welded to inliner 29 disengaging from cover 19. Afterwards inside lining 31 and inliner 29 are cut along opening edge 30 so that the liquid contents can be drained from drum 17.

For re-use of wide-neck drum 17 inliner 29 is removed from the drum, any residual film of inliner 29 which may be adhering to opening edge 30 is scraped off, and new inliner 29 is inserted into drum 17 and new inside lining 31 is inserted into cover 19.

In a modification of described wide-neck drum 17 inside lining 31 of cover 19 and inliner 29 can be produced from metal-plastic composite foil, for example, aluminum foil covered on one side with polyethylene, the aluminum foil of inside lining 31 resting against cover 19 and the aluminum foil of inliner 29 resting against drum body 2. In this version of the drum inliner 29 can be easily removed from drum 17 since it is not welded to opening edge 30 of the drum.

In another version of the wide-neck drum, inliner 29 and inside lining 31 of cover 19 consist of plastic film, for example, polyethylene film. Between sealing ring 28 and inside lining 31 of cover 19 thin metal ring 33 with a U-profile, for example an aluminum ring, can be inserted into annulus 27 between outside edge 23 of the cover and inside edge 24 of the cover, and another ring 34 of aluminum with a U-profile is seated on opening edge 30 of barrel 17; on the profile rests upper edge 32 of inliner 29 turned down to the outside. Optionally aluminum ring 34 seated on opening edge 30 of drum 17 can be omitted.

Wide-neck drum 17 reconditioned according to the above described process from tight head drum 1 according to DIN 6131 with a nominal volume of for example 220 liters has, at the same nominal volume, standard diameter D1 of 581 millimeters ±3 millimeters and standard height H of 935 millimeters ±5 millimeters of standardized tight head drum 1.

When tight head drum 1 is reconditioned for re-use as a tight head drum, after separating upper head 4 from drum body 2 on sized cut edge 10 of the drum body new upper head 4 with fill and drain plug 5 and vent plug 6 is welded on.

Tight-head drums produced in one piece by injection molding can likewise be reconditioned according to the above described process.

I claim:

1. Process for reconditioning a standardized tight head drum for re-use as a tight head drum, said standardized tight head drum having a drum body extending along a longitudinal axis, a lower head, and an upper head drum welded to said drum body at a seam, the process comprising:

a) mechanically separating the upper drum head along a parting cut line transverse to said longitudinal axis and below said seam, said parting cut resulting in an upper annular cut edge of the drum body;

b) smoothing said resulting upper annular cut edge to produce a smooth weld surface;

c) cleaning the interior of the drum body;

d) sizing said upper annular cut edge of the drum body; and e) welding an upper head having a fill plug and a vent plug onto the sized upper annular cut edge of the drum body to produce a reconditioned tight head drum having the same nominal volume and the same height and diameter dimensions as said standardized tight head drum, then smoothing the weld, and leak testing the reconditioned tight head drum.

2. Process according to claim 1, wherein the smoothing of said resulting upper annular cut edge is effected by paring or shaping.

3. Process according to claim 1, wherein the sizing is effected by pushing the cleaned drum body onto a sizing arbor, and heating the drum body in the area of said cut edge such that said drum body upon subsequent cooling is shrink fitted.

4. Process according to claim 1, wherein said weld is smoothed from the outside by shaping or paring.

5. Process for reconditioning a standardized tight head drum for re-use as a wide-neck drum, said standardized tight head drum having a drum body extending along a longitudinal axis, a lower head, and an upper head drum welded to said drum body at a seam, the process comprising:

a) mechanically separating the upper drum head along a parting cut line transverse to said longitudinal axis and below said seam, said parting cut resulting in an upper annular cut edge of the drum body;

b) smoothing said resulting upper annular cut edge to produce a smooth weld surface;

c) cleaning the interior of the drum body;

d) sizing said upper annular cut edge of the drum body; and e) welding on the cut edge a neck ring having a peripheral flange and a lower edge, said peripheral flange projecting outwardly of the lower edge of the neck ring, said flange having a smaller diameter then the diameter of the drum body to produce a reconditioned wide-neck drum having the same nominal volume and the same height and diameter dimensions as said standardized tight head drum, then smoothing the weld, leak testing the reconditioned wide-neck drum, placing a wide-neck drum cover having a lower flange on the neck ring such that the lower flange rests on said peripheral flange, and attaching both flanges with a clamp ring.

6. Process according to claim 5, wherein the smoothing of said resulting upper annular cut edge is effected by paring or shaping.

7. Process according to claim 5, wherein the sizing is effected by pushing the cleaned drum body onto a sizing arbor, and heating the drum body in the area of said cut edge such that said drum body upon subsequent body is shrink fitted.

8. Process according to claim 5, wherein said weld is smoothed from the outside by shaping or paring.

9. Process according to claim 5, further comprising inserting an inliner into said drum body, and turning said inliner down to the outside over an opening edge of said neck ring prior to placing the wide-neck drum cover on said neck ring.

* * * * *